United States Patent [19]

Kicher et al.

[11] 3,814,470

[45] June 4, 1974

[54] IMPACT ABSORBER

[75] Inventors: Thomas P. Kicher, South Euclid, Ohio; Lawrence A. Nattrass, Okemos, Mich.

[73] Assignee: Case Western Reserve University, Cleveland, Ohio

[22] Filed: Aug. 16, 1972

[21] Appl. No.: 281,177

[52] U.S. Cl. .................................. 293/70, 267/139
[51] Int. Cl. ........................ B60r 19/08, F16f 7/00
[58] Field of Search ......... 293/70, 89; 267/139, 140

[56] References Cited
UNITED STATES PATENTS

| R27,318 | 3/1972 | Gensheimer | 267/140 |
| 3,677,017 | 7/1972 | Shirvany | 267/140 |
| 3,702,202 | 11/1972 | Rumsey | 267/139 |
| 3,738,696 | 6/1973 | McLauchlan | 293/70 |

OTHER PUBLICATIONS

Elements of Strength of Materials; Timoshenko and MacCullough; June, 1949; Van Nostrand Co., Inc., pp. 290-291.

Primary Examiner—M. Henson Wood, Jr.
Assistant Examiner—Robert Saifer
Attorney, Agent, or Firm—McNenny, Farrington, Pearne & Gordon

[57] ABSTRACT

A mechanical energy storage device is disclosed in which a column is elastically buckled to develop a constant force over an extended axial deflection of the column end. The constant deflection force produces a substantially square wave response allowing maximum energy storage in systems where limits are imposed on both deflection and force. Several embodiments disclose buckling mode control means for changing the buckling force into successively higher levels. The disclosed mode control means comprises restraining surfaces which restrict lateral deflection of column mid-portions and thereby cause the column to buckle into successively greater numbers of waves in response to increased end deflection.

18 Claims, 14 Drawing Figures

PATENTED JUN 4 1974 3,814,470

IMPACT ABSORBER

BACKGROUND OF THE INVENTION

The invention relates to mechanical energy storage devices and in particular pertains to a device having an elastic buckling column as an energy storage medium.

FIELD OF THE INVENTION

Energy absorbers protect a system or component from structural damage by minimizing the potential forces produced during a collision between rigid bodies. In a collision between two objects, the kinetic energy of the objects is normally transformed into strain energy as the objects are deformed elastically and/or plastically.

In most instances, it is desirable to maintain the collision forces below a value which would cause permanent damage to a colliding object or element. Often, it is also important or necessary to limit the amount of strain or deflection taken by a member during a collision. With limitations on force and deflection, an energy absorbing system will be of maximum efficiency when it develops a uniform or constant resisting force equal to the allowable maximum through the allowable deflection. In more technical terms, the relative efficiency of an energy absorbing system may be determined by comparison with the 100 percent efficiency of a square wave in which the force level is exactly constant throughout a given deflection.

The present invention is particularly suited for use in a bumper system for automobiles and other vehicles. An automobile bumper having proper deflection characteristics should be capable of sustaining minor impacts without damage to itself and sustaining moderate speed collisions without damage to adjacent body sheet metal. An upper limit on the effective bumper stiffness is usually imposed by the strength of the vehicle frame. Since normally there are practical limits on the amplitude of bumper retraction set by the arrangement of adjacent sheet metal, the associated weight and bulk of guiding apparatus for the bumper, and various other considerations, it is important that the deflection characteristics of the bumper approach square wave efficiency. The bumper system, then, will absorb as much energy as is possible before the limits of force and/or deflection are exceeded in a collision.

PRIOR ART

Various energy absorbing arrangements have been proposed for use in vehicle bumper systems. Among these are arrangements which include spring members, usually metallic, effectively mounted between a rigid vehicle frame and a rigid bumper. In general, such spring arrangements produce a force which increases linearly with deflection according to Hooke's law. The energy absorbing efficiency of such systems is generally 50 percent of that of square wave performance. Rubber pads or cushions used as substitutes for or in combination with metallic springs are usually characterized by a constantly increasing or non-linear deflection force and have an associated efficiency of about 30 percent.

A number of proposed bumper arrangements have depended on plastic deformation of an element to produce a relatively constant deflection force over an extended distance to achieve corresponding high efficiency. A serious disadvantage of this approach is that the deformed element may be used effectively only one time and must thereafter be replaced.

In certain situations it is desirable to provide a system which is adapted to produce two or more levels of resistance in response to corresponding levels of deflection. Previous efforts towards development of a practical system capable of producing more than one level of constant force have generally been without success. Hydraulic shock control systems, for example, are usually unsatisfactory because of their relative cost, sensitivity and loss of reliability over extended periods.

SUMMARY OF THE INVENTION

The invention provides an energy storage device which employs an elastic buckling column to produce a constant level force during extended axial deflection of one of its ends. The illustrated embodiments of the invention relate to vehicle bumper applications wherein full advantage of the constant force deflection characteristics of a column may be taken. Maximum collision energy is absorbed before deflection or force limits are exceeded.

In the preferred embodiment, guide means are provided to maintain the column ends in alignment with the free column axis while allowing one end to move axially relative to the other. Preferably, the ends of the column are restrained from pivoting to develop a relatively high deflection or bulking force for a given column size.

Certain embodiments disclosed hereinbelow include buckling control means for changing the wave form taken by a column after it obtains a predetermined end deflection and energy level. As explained hereinafter, an end buckling force on a column is a function of the mode or number of waves formed by the column as it deflects laterally from its free longitudinal axis. Preferably, the buckling control means comprises a pair of control surfaces parallel to the free column axis with at least one of the surfaces laterally spaced from the free position of the column. A column is effectively mounted between a rigid vehicle frame and a rigid bumper such that, in service, the column is axially compressed when a collision load is directly aainst the bumper.

The column resists initial bumper retraction with a predetermined first force level. This level may be selected, for example, to protect the bumper from superficial damage which would otherwise mar its appearance. When the column end has been deflected to a specific point, the midportion of the column engages a control or restraining surface. Further bumper retraction produces increased end loading on the column causing the column to assume a wave form of a higher mode and develop a new level of end force resistance. The end force resistance or buckling load of this second mode may be selected slightly below that which would structurally damage the frame of the vehicle. The column may be arranged to deflect at this load for a distance at least equal to that at which body sheet metal damage will occur through direct contact with a colliding object.

As disclosed and verified experimentally, a column may be successfully forced to change its buckling mode at least two times. A corresponding number of force resistance levels is produced to thereby suit a particular situation or set of requirements. As will be apparent from the description below, the invention provides a multi-force level device for use as an energy absorber or as an actuator. The device has a minimum number of parts and may be fabricated and assembled with a minimum expenditure in tooling and assembly labor. The structural simplicity of the energy storage device, additionally, insures a high level of reliability of performance throughout an extended period of service.

DESCRIPTION OF THE PREFERRED EMBODIMENT

Figure 1:
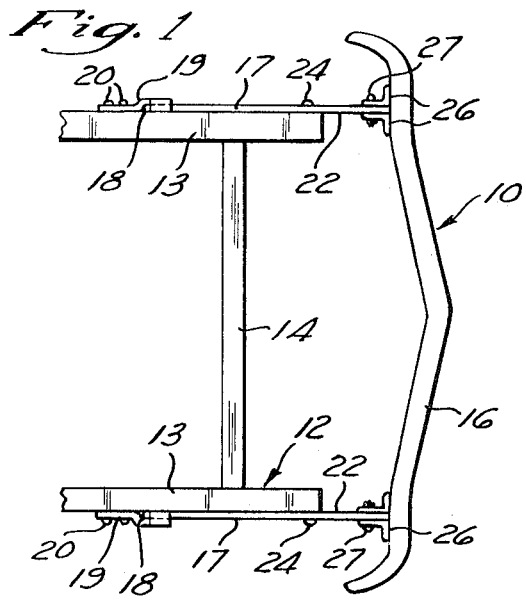
FIG. 1 is a plan view of a bumper system in accordance with a first embodiment of the invention.
Figure 2:
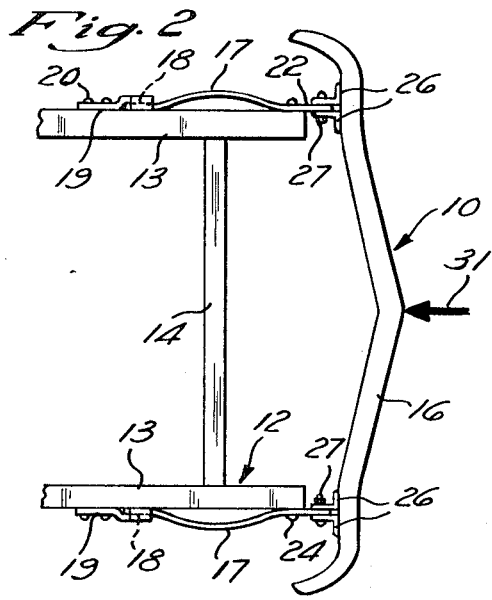
FIG. 2 is a plan view, similar to FIG. 1, of the bumper system illustrating the bumper in a deflected or retracted relationship relative to a vehicle frame.
Figure 3:
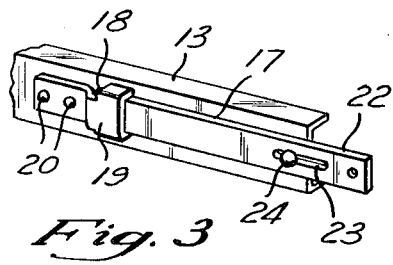
FIG. 3 is a perspective fragmentary view of the vehicle frame and an elastic buckling column in FIGS. 1 and 2 showing details of a manner of attaching the column to the frame.

Referring now to the drawings, FIGS. 1 through 3 illustrate a first embodiment of the invention. There is provided a bumper assembly 10 for absorbing the energy of an impact between a vehicle such as an automobile and another object. The bumper assembly 10 is mounted on a rigid vehicle frame 12, partially shown in FIGS. 1 through 3. The frame 12 comprises a pair of parallel longitudinally extending frame rails 13 and a number of cross bar members 14, one of which is illustrated, extending generally perpendicular to the longitudinal rails 13. The rails 13 extend parallel to the longitudinal axis of the vehicle and along substantially the full length of the vehicle. While the frame construction illustrated is of a conventional ladder type construction it is to be understood that the principles of the invention may be applied to other types of vehicle frame or body constructions such as where the frame and body are integral.

The bumper assembly 10 comprises a substantially rigid bumper 16 which extends transversely to the longitudinal axis of the vehicle. A bumper 16 may be mounted at either or both ends of the vehicle so that it projects outwardly of adjacent sheet metal of the vehicle body to protect the latter when the vehicle engages another object in a collision. In a conventional manner, the cross member 14 and bumper 16 extend horizontally or parallel to the ground or road surface. Normally, the bumper 16 is formed of steel or other metal as is the vehicle frame 12. The bumper 16 is supported on the frame 12 by a pair of identical parallel columns 17 which extend along outside portions of the longitudinal frame members 13. Rearward ends 18 of the columns 17 are fixed on the frame rails 13 by suitable brackets 19 secured to the frame members 13 by bolts 20. The columns 17, preferably, are rectangular in cross section and arranged with their least moments of inertia perpendicular to the frame rails 13 so that they are adapted to buckle laterally or horizontally from the rails.

As seen in FIG. 3, the forward ends, designated 22, of the columns 17 are provided with longitudinally extending slots 23. Guide bolts 24 are positioned in these slots 23 and are anchored in the frame rails 13 to permit the forward ends 22 of the columns to move axially or longitudinally relative to the frame rails while preventing lateral movement of these end portions. The outer or forward column ends 22 are fixed to the bumper 16 by associated brackets 26 and clamping bolts 27. The brackets 19 and 26 are arranged to restrain the associated ends 18 and 22 of each column 17 from pivoting out of a plane defined by the free position of their respective column during buckling.

Figure 4:
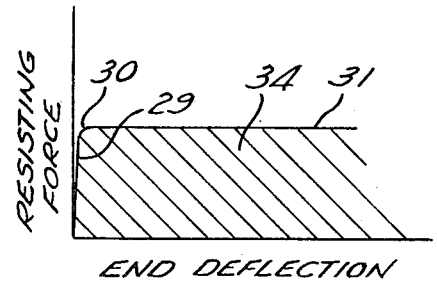
FIG. 4 is a diagrammatic curve representing the characteristics of the bumper system illustrated in FIGS. 1 through 3, plotting axial column force versus column end deflection.
Figure 5:
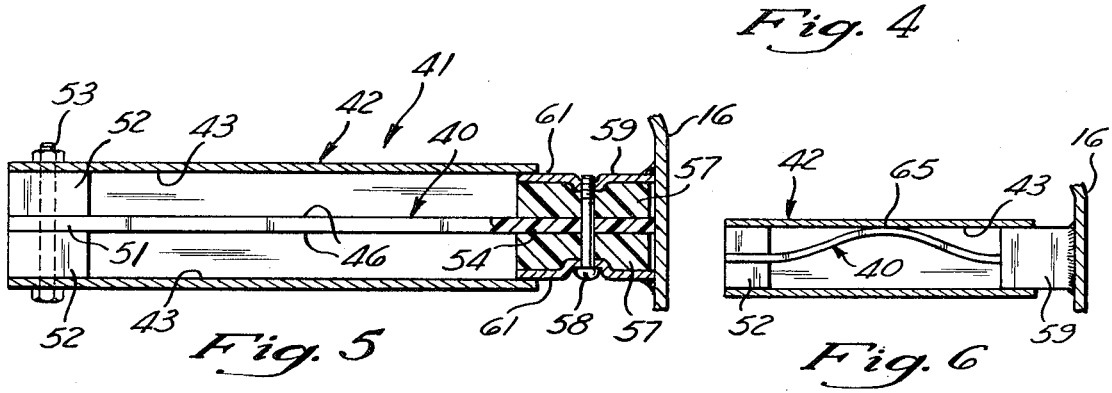
FIG. 5 is a longitudinal sectional view of an elastic buckling column and associated bumper assembly members in accordance with a second embodiment of the invention.

When a collision force, indicated by an arrow 31 in FIG. 2 is sustained by the bumper 16, the bumper tends to retract or move towards the frame 12. Bumper movement produces corresponding axial end deflection of the columns 17. The resisting force developed by the columns 17 is plotted against end deflection amplitude in FIG. 4. The vertical and horizontal scales of the graph of FIG. 4 are arbitrarily chosen and the graph may be considered to generally illustrate the combined resistance of both of the columns 17. It may then be understood that the resistance developed by each column 17 will be half of that indicated in the curve.

Inspection of the curve of FIG. 4 reveals that column resistance against end deflection increases very rapidly from 0 to a peak constant force level indicated by a generally horizontal line 31. The initial slope of the curve, designated 29, represents axial compression of the columns up to a point 30 at which the columns 17 buckle. As illustrated, the relationship between column end deflection and axial resisting force developed by the columns closely approximates a square wave. The energy absorbed by the columns 17 is represented by the cross hatched area 34 under the curve of FIG. 14. It may be seen that the difference between the response of the column from a true square wave is represented by the area to the left of the sloped portion 29 of the curve and, as such, is negligible in comparison to the area 34 under the curve.

The magnitude of the constant force level 31 is a function of the column geometry and physical properties of the column material. This force is given by the relationship known as the Euler buckling equation $F = \pi^2 EI/l^2$ Where
$E$ = the elastic modulus of the material.
$I$ = the least moment of inertia of the column cross section
$l$ = the length of the column subject to flexure.

For the condition where both column ends are restrained from pivoting (as in this and the embodiments discussed below) this equation is adjusted by using an effective column length equal to half of the actual length between the restraints. It follows from the equation that restraining the column ends increases buckling loads. Nevertheless, it is to be understood that the invention is not limited to use of column end restraints.

Properties of the columns 17 may be selected such that they buckle at a force slightly below the force which will cause structural failure or permanent damage to the frame 12. Similarly, the columns 17 may be arranged to provide as much end deflection as is necessary to accommodate a desired amount of bumper retraction. The energy absorbed by the column may be computed as a product of the instantaneous column force and deflection or, more precisely, the integral of force over the deflection length.

In an automobile or other vehicle, the frame strength is generally limited to a particular known value and the maximum desired bumper deflection is determined by placement of the bumper relative to adjacent body portions. The square wave force deflection performance of the bumper assembly 10 is therefore highly suitable for protecting an automobile since it is adapted to absorb a maximum amount of energy within the limits imposed by the frame and body design of the vehicle.

FIGS. 5 through 8 illustrate a second embodiment of the invention wherein an elastic buckling column 40 is adapted to produce more than one level of resistance or end force. In this and the embodiments disclosed below, the same numerals have been used to designate like parts where it is convienent. The column 40 forms part of a shock absorbing bumper assembly 41 for use similar to the bumper assembly 10 of the first described embodiment. The bumper assembly 41 comprises an elongated rectangular tube 42 arranged to surround a major portion of the length of the elastic column 40. Preferably, the elongated tube is rectangular in cross section so that it provides opposed inner planar wall surfaces 43.

The shock absorbing bumper assembly 41 may be substituted for the buckling columns 17 of the first embodiment by suitably securing a pair of such assemblies 41 to the frame rails 13 in place of the columns and brackets 19 and 26. Alternatively, the frame rails 13 may be formed as rectangular tubes in the manner of the tubes 42 at least in the area adjacent the bumper 16. In this latter case, a column 40 may be positioned in each frame rail with substantially the same geometry as that illustrated in FIGS. 5 through 8. The column 40, ideally, is rectangular in cross section and has its wide sides 46 facing the inner planar wall surfaces 43. The least moment of inertia of the column is therefore perpendicular to these surfaces 43 and the column 40 is adapted to buckle against them.

An end 51 of the column 40 is fixed relative to the rectangular tube 42 by a pair of rigid clamping blocks 52 and a bolt and nut assembly 53. At its other end 54, the column 40 is fixed to the bumper 16 by a similar pair of clamping blocks 57 and a clamping bolt 58. As shown, the clamping blocks 57 are retained in a bracket assembly 59 welded or otherwise secured to the bumper 16. The clamping blocks 52 and 57 are proportioned to support the column 40 centrally between the oppositely facing planar tube surface 43. The clamping blocks 52 and 57 restrain the clamped portions of the column ends 51 and 54 respectively from pivoting out of a plane, defined by the free position of the column 40, when the column buckles. External surfaces 61 of the bracket assembly 59 slidably engage the inner planar wall surfaces 43 of the rectangular tube and are axially guided thereby to permit the associated column end 54 to move towards the opposite column end 51, while preventing lateral column end movement, when the column buckles.

When a collision force is directed against the bumper 16, the column 40 is axially compressed. If the compression force on the column 40 exceeds that defined by the Euler equation, set out above, again corrected for restrained end conditions and applied to the physical characteristics of the column 40, the column will buckle laterally out of the plane defined by its free position in a direction parallel to that of the least moment of inertia of the column. Assuming that the collision energy is of sufficient magnitude, the column will continue to buckle laterally with increased deflection of the movable end 54 until the midportion of the column engages either one of the inner planar wall surfaces 43 of the tube 42.

The resisting force developed by the column 40 generally follows the same form as the curve illustrated in FIG. 4 until it reaches the restraining or control surface 43. Further lateral movement of the column 40 is thereafter restrained by the control surface 43 and the resisting force developed by the column increases sharply. Additional retraction of the bumper 16 and column end 54 eventually results in the column changing its mode of buckling from the single wave form illustrated in FIG. 6 to a second or higher mode characterized by a double or S shaped wave form.

The lateral deflection or amplitude of each wave from the free column plane in the second and successive modes increases from the onset of the mode with increased end deflection. The second mode is illustrated in the extreme in FIG. 7 where deflection of the column end 54 has increased from the onset of the second mode to a point where maxima 66 and 67 of both waves engage the inner restraining surfaces 43 of the tube. The spacing between the restraining or mode control surfaces 43 may be adjusted to provide a desired end deflection amplitude prior to a change in force level at a change in buckling mode. An increase in the spacing will result in an increase in end deflection amplitude.

Figure 7:
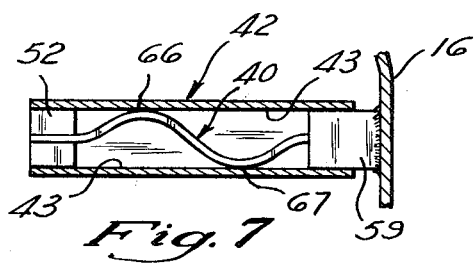
FIG. 7 is a longitudinal view similar to FIG. 5 showing the elastic column in a second buckling mode.
Figure 8:
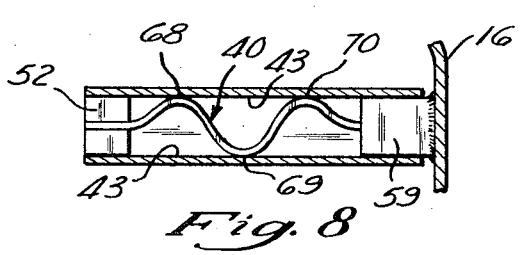
FIG. 8 is a longitudinal view of the elastic column similar to FIG. 5 showing the elastic column in a third buckling mode.

Still further retraction of the bumper 16 is met by sharply increased resistance of the column 40 until the column is eventually caused to buckle into a third mode characterized by three waves 68, 69 and 70 and illustrated in an extreme condition in FIG. 8. The wave forms or modes of FIGS. 7 and 8 may be described as antisymmetric. The number of buckling modes which may be formed by a column is generally limited by its elasticity and strength.

Figure 6:
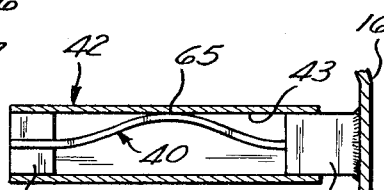
FIG. 6 is a longitudinal view similar to FIG. 5, but on a somewhat smaller scale, showing the elastic column in a first buckling mode.
Figure 9:
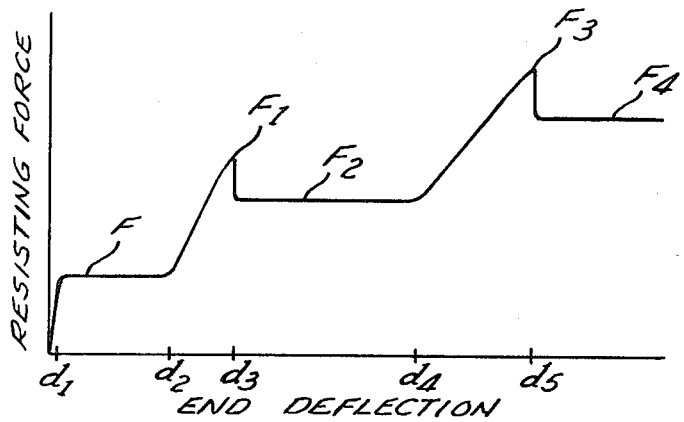
FIG. 9 is a diagrammatic curve illustrating the buckling resistance force versus end deflection of the column assembly illustrated in FIG. 5 through the various modes illustrated in FIGS. 6 through 8.

FIG. 9 illustrates the relationship between axial column force and axial column end deflection for the buckling modes illustrated in FIGS. 6 through 8. Deflection $d_1$ represents the point at which the column buckles out of its free plane at the force level F, given by the Euler equation. The column maintains this force level F as end deflection and lateral wave amplitude increase.

Deflection $d_2$ represents the column condition illustrated in FIG. 6 where the column 40 begins to contact the restraining control surface 43. As indicated in FIG. 9, the end resistance of the column increases significantly from the point at which the column contacts the restraining surface 43 to a point $d_3$ at which the column buckles into the second mode. The end resistance at this point drops slightly from a peak $F_1$ to a generally constant force level $F_2$. The column end force remains at this constant level $F_2$ through an increase in end deflection and wave amplitude to a point $d_4$ corresponding to the condition illustrated in FIG. 7 where the column has contacted the restraining wall 43 at its maxima 66 and 67.

As previously indicated, the end resistance of the column again increases sharply between the end deflection point $d_4$ and the point $d_5$ to a force peak $F_3$. The end deflection $d_5$ represents the point at which the column buckles into the third mode forming the three wave maxima 68, 69 and 70 (FIG. 8) and at which the end force drops slightly to a constant force level $F_4$. The column maintains this level of resistance $F_4$ until the end deflection is sufficient to cause the wave maxima 68, 69 and 70 to contact the restraining surfaces 43 as indicated in FIG. 8. At this point column force will again increase sharply (not shown in FIG. 9).

Study of FIG. 9 shows that the bumper assembly 41 is adapted to produce a series of increasing force levels which may be generally represented by a series of stepped square waves. By selecting suitable physical characteristics for the column 40, a desired force range and end deflection range may be obtained for a particular application. For example, the initial buckling force level F associated with the first mode of buckling between $d_1$ and $d_2$ may be selected to protect a vehicle bumper from minor damage in a relatively light collision while the force levels $F_1$ and $F_2$ at the second buckling mode may be selected to be slightly below the yield strength of the vehicle frame to protect the frame from excessive force in a collision. Still further, the force values $F_3$ and $F_4$ of the third buckling mode may be arranged to minimize the amount of permanent structural damage sustained by the vehicle frame.

Figure 10:
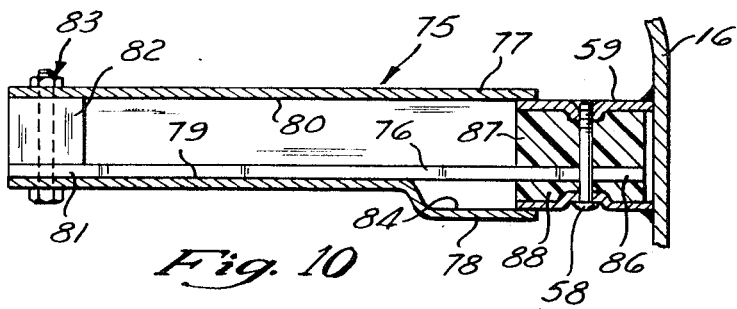
FIG. 10 is a longitudinal sectional view of an elastic buckling column and associated bumper assembly in accordance with a third embodiment of the invention.
Figure 11:
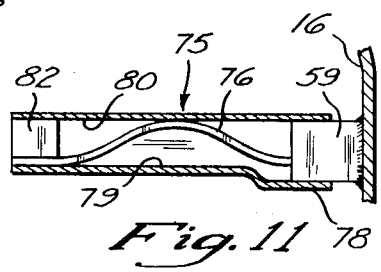
FIG. 11 is a longitudinal view similar to FIG. 10, but on a somewhat smaller scale, showing the elastic buckling column in a first mode of buckling.
Figure 12:
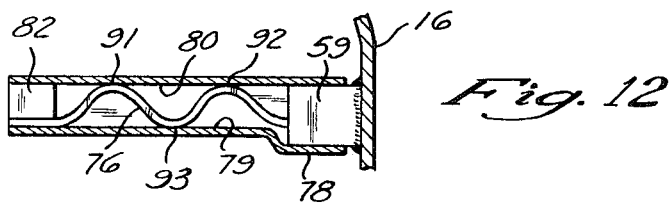
FIG. 12 is a longitudinal view similar to FIG. 10 illustrating the elastic column in a second buckling mode.

Referring now to FIGS. 10 through 12, there is shown a third embodiment of the invention wherein a bumper assembly 75 includes an elastic buckling column 76 restrained within an elongated rigid tube 77 of generally rectangular cross section. The arrangement of the bumper assembly 75 and its manner of operation is similar to that described in reference to the second embodiment of FIGS. 5 through 8. In contrast to this earlier described embodiment, the buckling column 76 is contiguous with a inner planar restraining surface 79 of the tube 77. One end 81 of the column 76 is fixed to the tube 77 by a rigid clamping block 82 and a bolt and nut assembly 83. At its other end 86 the column 76 is fixed to the bumper 16 by a set of rigid blocks 87 and 88 retained in the bracket assembly 59 by the cross bolt 58.

Opposite the inner tube wall 79 is a parallel interior tube wall 80 adapted to control lateral buckling of the elastic column 76. An end of the tube 77 is offset at 78 to accommodate the bumper bracket assembly 59. An inner surface 84 at this offset 78 and an opposed portion of the inner surface 80 of the tube 77 are adapted to axially guide the bracket assembly 59 and prevent pivoting of the column end 86.

The assembly 75 may be substituted for either of the previously described embodiments. The load on the column 76 required to initiate buckling in the first mode is again given by the above Euler buckling equation. The resisting force developed by the column 76 in the first mode will follow a curve like either that shown in FIG. 4 or that shown in the curve portion to the left of deflection $d_2$ of FIG. 9.

When the column 76 deflects in the first mode to the extreme position shown in FIG. 11 and the column laterally engages the surface 80, the end resistance of the column increases rapidly until the column is forced into a second buckling mode characterized by two waves (FIG. 12). The end resistance thereafter remains substantially constant for increased end deflection until wave form maxima 91, 92 and 93 eventually engage the associated restraining surfaces 79 and 80 as illustrated in FIG. 12. The spacing between the wall surfaces 79 and 80, as in the prior assembly 41, determines the end deflection amplitude prior to a change in buckling mode and force level. The wave form of FIG. 12 may be described as symmetric.

The force level of the second mode illustrated in FIG. 12 is proportionately greater in magnitude with respect to the force level of the first buckling mode illustrated in FIG. 11 than the corresponding proportion in the assembly 41 of the second embodiment between the second mode of FIG. 7 and the first mode of FIG. 6. This change in proportions may be shown by mathematical analysis of appropriate column stress equations. Thus, the assembly 75 may be used in applications where it is desirable to have a relatively large change in end resistance when the column changes from a first buckling mode to a second mode.

Figure 13:
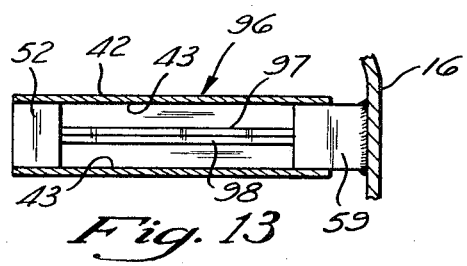
FIG. 13 is a longitudinal view of a pair of parallel elastic buckling columns in an associated bumper assembly in accordance with a fourth embodiment of the invention.
Figure 14:
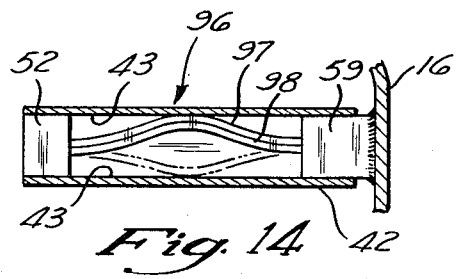
FIG. 14 is a longitudinal view similar to FIG. 13 showing the buckling columns in a first buckling mode.

FIGS. 13 and 14 illustrate a fourth form of the invention which is a modification of the second described assembly 41. A bumper or shock absorbing assembly 96 includes two substantially identical parallel elastic buckling columns 97 and 98. The columns, 97 and 98 are centered in the elongated rectangular tube 42 and each column is rectangular in cross section with its least moment of inertia in alignment with that of the other column. Preferably, the columns 97 and 98 are longitudinally contiguous. As in the previous embodiments, when a compression force on the bumper 16 is sufficient, the elastic columns 97 and 98 are caused to buckle laterally out of their planes. The columns 97 and 98 generally respond in the same manner as a single column by buckling into successive modes. At the first buckling mode, however, the columns 97 and 98 may buckle in opposite directions as indicated in phantom outline in FIG. 14. Such a circumstance would not have a significant effect on the force-deflection characteristics of the system. In subsequent modes, the columns are restrained by each other and flex in a parallel manner.

An important advantage of the multiple stacked columns 97 and 98 is an increase or multiplication of column end resistance without a significant loss in end deflection stroke. A single column of greater thickness and equivalent buckling strength would fail through excessive strain in its outer fibers. FIG. 14 shows the multiple columns 97 and 98 in the extreme position of the first buckling mode where one of the columns 97 has engaged the inner restraining surface 43. Further end deflection of the columns from that illustrated in FIG. 14 causes the columns to assume the second mode wave form illustrated in FIG. 7.

It has been found that a relatively elastic material is necessary in the construction of a column to permit the column to flex into the sinuous modes illustrated in the drawings. An example of a commercially available material which has exhibited a satisfactory performance is manufactured under the trademark "SCOTCHPLY" type 1002 produced by 3M Company and having the following mechanical properties.

TABLE I

PROPERTIES OF 3M "SCOTCHPLY" TYPE 1002 — UNIDIRECTIONAL

| Mechanical Property | | |
|---|---|---|
| Load Angle | 0° | 90° |
| Tensile Strength (KSI) | 160 | 2.9 |
| Tensile Modulus (psi × $10^6$) | 5.7 | 1.4 |
| Experimental Compressive Modulus (psi × $10^6$) | 5.3 | |
| Experimental Interlaminar Shear Strength (psi) | 4.4 | |
| | 4300 | |

This material is a unidirectional composite of fiberglass reinforced resin and may be advantageously arranged as a column with the reinforcing fibers aligned with the column axis. A material having a high modulus of elastic resilience is particularly suited for fabrication into an elastic buckling column for maximum energy absorption in a device embodying the invention. The modulus of elastic resilience may be expressed as $M = S^2/2E$ where S is the yield stress of the material and E, is again, the modulus of elasticity. In terms of resilience, the above described composite material is substantially more efficient than carbon or alloy spring steel which, typically, has a yield stress of 80–220 ksi and a modulus of $30 \times 10^6$ psi. Substituting a yield stress value of 200 ksi and the modulus of steel into the resilience equation yields a modulus of elastic resilience of 670 in-lb/in$^3$.

Using the properties for the composite material set out in Table I, above, a resilience oefficient for the reinforced composite material is about 2,360 in-lb/in$^3$. Comparing the respective moduli of steel and the composite fiber reinforced material, it is found that the composite material is about 3.8 times more efficient than steel. Moreover, it has been found that steel, which exhibits a definite yeild point, has a tendency to collapse under excessive buckling load by forming an elastic hinge at a point where yielding first occurs. This phenomena does not occur with a material which does not have a definite yield point such as the fiber reinforced material described above.

While in the disclosed emboidments, the buckling columns have been provided with rectangular cross sections, it is contemplated that other cross-sectional shapes, circular for example, amy be employed in construction of a column. Where desired, a buckling column or columns may be arranged in other than parallel relationship with the longitudinal axis of a vehicle. In this case, means such as a pivotal link may be used to convert bumper retraction in the longitudinal direction of the vehicle into axial movement of a column end.

It is expected that the principles of the invention may be applied to various mechanical energy storage devices other than shock absorbing apparatus such as disclosed. For example, a column which develops more than one level of force is suitable for use as a mechanical force actuator or as a device to statically balance an object at a plurality of positions requiring different balancing forces. Of course, the invention may be used in shock absorbing apparatus other than in a vehicle bumper. Another automotive application of the invention is in a deflectable sterring wheel system for cushioning possible impact of a driver during a collision. A suitable locking device may be employed to prevent rebound of the deflected column end from its maximum compressed position.

Although several preferred embodiments of the invention have been illustrated, it is to be understood that various other modifications and rearrangements may be resorted to without departing from the scope of the invention disclosed herein.

We claim:

1. An energy absorbing bumper system for a vehicle comprising a rigid frame, a bumper, an elastic column connected between the frame and the bumper, mounting means for holding one end of the column stationary with respect to the frame, guide means for limiting movement of the other end of the column along a substantially axial direction and allowing lateral movement of the midportion of the column during buckling action therein, buckling mode control jeans for changing the mode of buckling when deflection of said other end towards said one end reaches a predetermined point whereby the buckling force is increased from a first level to a second level to absorb a greater amount of energy per unit of travel.

2. A bumper system as set forth in claim 1 wherein said mounting means is adapted to prevent its associated column end from pivoting and restraining means is provided to prevent said other end from pivoting.

3. A bumper system as set forth in claim 2 wherein said mode control means comprises a surface which limits lateral movement of the column to a predetermined maximum.

4. A bumper system as set forth in claim 3 wherein said surface is spaced laterally on one side of the column, and including a second surface on the opposite side of the column having substantially the same spacing from the column as the spacing of the first mentioned surface from the column.

5. A bumper system as set forth in claim 3 wherein said column is formed of a material having a modulus of elastic resilience substantially in excess of 670 in-lb/in$^3$.

6. A bumper system as set forth in claim 5 wherein said column material is fiber reinforced resin having its fibers aligned in a direction along the column axis.

7. An elastic energy absorbing system in a bumper assembly of a vehicle comprising a rigid vehicle frame, a bumper carried on the frame, an elastic column, means for holding one end of the column stationary with respect to the frame, means at the other end of the column causing the column to move in response to movement of the bumper, guide means for limiting movement of the other column end along a substantially axial direction, buckling control surface means including a surface laterally displaced from a midportion of the column and adapted to prevent lateral buckling of the column midportion substantially beyond the surface when the one end of the column is deflected in response to bumper movement whereby the column is caused to buckle into a secondary mode to increase its resistance to bumper movement.

8. An elastic energy absorbing system as set forth in claim 7 including claming means at each end of the column for maintaining the column end portions in alignment with a plane defined by a free axis of the column.

9. An elastic energy absorbing system as set forth in claim 8 wherein a second column is provided in parallel relationship with said column whereby substantially equal resisting forces are developed by said columns when said bumper is deflected.

10. An elastic energy absorbing system as set forth in claim 9 wherein said columns are longitudinally contiguous.

11. A bumper assembly comprising a rigid vehicle frame generally defining a longitudinal vehicle axis, a rigid bumper at one end of the frame and extending generally transverse to the vehicle axis, a pair of spaced elastic columns arranged substantially parallel to the vehicle axis, means for fixing end portions of each column distant from the bumper relative to the frame and holding such distant portions in parallel alignment with the vehicle axis, means for fixing the other end portions of each column relative to said bumper and for holding such portions in parallel alignment with the vehicle axis, guide means for limiting movement of said other column ends along a direction substantially parallel to the vehicle axis, a restraining surface associated with each column supported on the vehicle frame and having a predetermined lateral spacing from a normal position of the associated column whereby lateral deflection of said columns is limited to thereby cause said columns to change from a first buckling mode to a higher order mode when bumper retraction movement exceeds a predetermined distance.

12. A bumper assembly as set forth in claim 11 wherein said columns are generally rectangular in section transverse to said vehicle axis and each of said restraining surfaces include flat portions lying in a plane parallel to the vehicle axis and parallel to one of the wide sides of the associated column.

13. A bumper assembly as set forth in claim 12 wherein said guide means includes said restraining surfaces whereby said restraining surfaces resist lateral forces on said other column ends.

14. A mechanical energy storage device adapted to provide at least two distinct substantially constant force levels over an extended deflection comprising an elastic column adapted to buckle when subjected to an axial end force, guide means for axially guiding one end of the column relative to the other, restraining means for preventing the ends of the column from pivoting out of an axial plane, and buckling control means for causing the column to buckle into a higher mode when end deflection of the column reaches a predetermined amplitude whereby the buckling force developed by the column increases to a corresponding higher level.

15. A mechanical energy storage device adapted to provide at least two distinct substantially constant force levels over an extended deflection comprising an elastic column adapted to buckle when subjected to an axial end force, guide means for axially guiding one end of the column relative to the other, and buckling control means for causing the column to buckle into a higher mode when end deflection of the column reaches a predetermined amplitude whereby the buckling force developed by the column increases to a corresponding higher level, said buckling control means including a first surface adjacent the midportion of the column and laterally spaced from a free position of the column.

16. A device as set forth in claim 15 wherein said buckling control means includes a second surface on a side of the column opposite said first surface, said second surface being laterally spaced from the free position of the column.

17. A device as set forth in claim 15 wherein said buckling control means includes a second surface on a side of the column opposite said first surface, said second surface being contiguous to said column at its free position.

18. A mechanical energy storage device adapted to provide at least two distinct substantially constant force levels over an extended deflection comprising an elastic column adapted to buckle when subjected to an axial end force and formed of a material having a modulus of elastic resilience substantially in excess of 670 in.-lb./in.$^3$, guide means for axially guiding one end of the column relative to the other, and buckling control means for causing the column to buckle into a higher mode when end deflection of the column reaches a predetermined amplitude whereby the buckling force developed by the column increases to a corresponding higher level.

* * * * *

UNITED STATES PATENT OFFICE
CERTIFICATE OF CORRECTION

Patent No. 3,814,470    Dated June 4, 1974

Inventor(s) Thomas P. Kicher and Lawrence A. Nattrass

It is certified that error appears in the above-identified patent and that said Letters Patent are hereby corrected as shown below:

Column 5, line 29, "damgge" should be --damage--.

Column 8, line 1, "a" should be --an--.

Column 9, line 52, "80-220 ksi" should be --180-220 ksi--;

line 58, "oefficient" should be --coefficient--.

Column 10, line 3, "emboidments" should be --embodiments--;

line 6, "amy" should be --may--;

line 24, "sterring" should be --steering--; and line 44, "jeans" should be --means--.

Column 11, line 21, "claming" should be --clamping--.

Signed and sealed this 15th day of October 1974.

(SEAL)
Attest:

McCOY M. GIBSON JR.
Attesting Officer

C. MARSHALL DANN
Commissioner of Patents